July 15, 1952  M. E. McGOWAN  2,603,038
APPARATUS FOR CUTTING OFF LENGTHS OF TUBING
Filed July 11, 1945
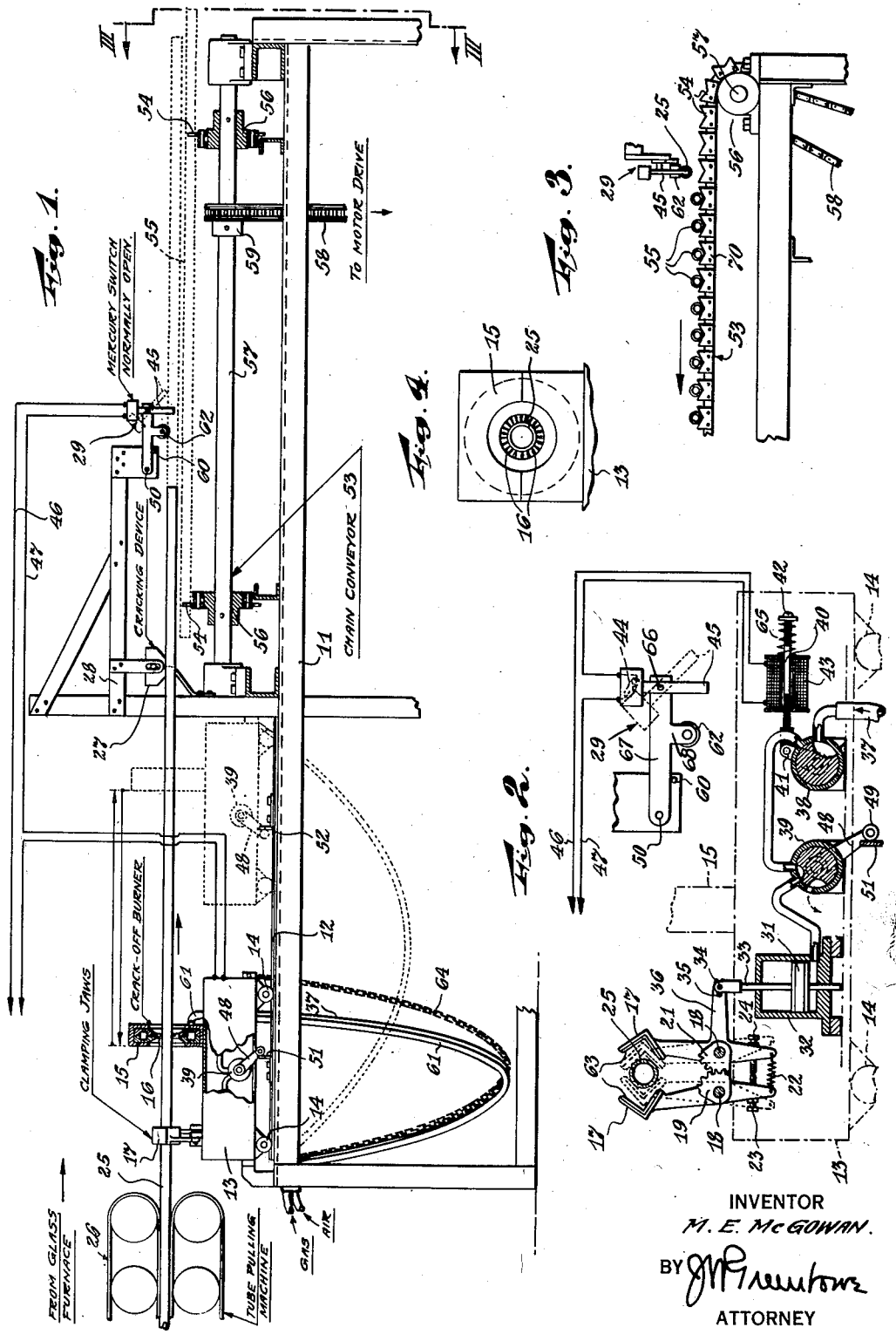
INVENTOR
M. E. McGOWAN.
BY
ATTORNEY Patented July 15, 1952

2,603,038

UNITED STATES PATENT OFFICE 2,603,038

APPARATUS FOR CUTTING OFF LENGTHS OF TUBING

Michael E. McGowan, Bloomfield, N. J., assignor to Westinghouse Electric Corporation, East Pittsburgh, Pa., a corporation of Pennsylvania Application July 11, 1945, Serial No. 604,377

3 Claims. (Cl. 49—50)

1

This invention relates to apparatus for accurately cutting off lengths of glass tubing and a method involving a preferred use of said apparatus.

The principal object of my invention, generally considered, is to measure and cut off lengths of vitreous tubing, accurately enough so that they can be used without further trimming or cutting.

Another object of my invention is to provide a carriage holding a crack-off burner and jaws for causing the carriage to travel along with tubing, lengths of which are to be cut off, a switch for causing said jaws to grip and release as desired, and a cracking device for severing the tubing at the places heated by said burner.

A further object of my invention is to accurately cut off lengths of tubing by a method involving passing such tubing through clamping jaws and a crack-off burner, until a piece of the desired length has passed beyond the burner, causing it to travel with the tubing to heat it at the crack-off point for a predetermined period of time, causing said jaws to release and, with the crack-off burner, return to initial position, while said tubing moves under a cracking device which cuts off an end portion at the point of heating, allowing the cut-off end portion to drop for removal, and passing the remainder of said tubing through said clamping jaws and crack-off burner, until another piece of the desired length has passed beyond said burner for repetition of the operation.

Other objects and advantages of the invention will become apparent as the description proceeds.

Referring to the drawing:

Fig. 1 is a side elevational view of apparatus for practicing my invention.

Fig. 2 is a fragmentary view, showing some of the details of the apparatus enclosed in the crack-off burner carriage.

Fig. 3 is a transverse sectional view on the line III—III of Fig. 1 in the direction of the arrows.

Fig. 4 is an end elevational view of the crack-off burner.

Referring to the drawing in detail, like parts being designated by like reference characters, there is shown a table or support 11 carrying a track 12 on which rests a carriage 13, supported on preferably four wheels 14. On the top of the carriage is mounted a ring burner 15 which directs gas flames 16 radially inward. The carriage also supports a pair of pneumatically operated clamping jaws 17, pivotally mounted as indicated at 18, and caused to move together by intermeshing segmental gears 19 and 21, carried thereby.

2

The clamping jaws 17 are desirably normally held apart by release spring 22, the limit of their movement being controlled by adjustable set screws 23 and 24, so that tubing 25 from a glass furnace may be fed freely therebetween, as by a tube-pulling machine 26.

The tubing 25 also passes through the ring burner 15 and under a cracking device 27, in the form of a relatively heavy metal weight loosely mounted on a frame 28. The frame 28 also carries a normally-open mercury switch device 29 which, along with the cracking device 27, engages the tubing 25 when the machine is operating. The switch device 29 is desirably carried on the top of a switch arm 45 which, when in normally-vertical position, terminates below the line of movement of the tubing 25 so as to be engaged and turned counterclockwise by the free end of said tubing, in order to close the mercury switch 44. The arm 45 is connected by pivot pin 66 to the free end of lever 67 carried on frame 28 by pivot pin 50. A roller 62, adapted to ride on the tubing 25 for holding the switch device 29 at an operative elevation, and below which the arm 45 extends, is carried on a normally-vertical extension 68, of the lever 67.

The carriage 13 contains mechanism for causing the jaws 17 to grip the glass tubing at the desired times. Such mechanism comprises a piston 31 operating in an air cylinder 32 and connected to one of the clamping jaws 17 by its rod 33, the end of which carries a pivot pin 34 fitting a notch 35 in the end of a jaw extension 36. The piston 31 is moved from its normally lower position, illustrated in Fig. 2, by compressed air from line 37 connected thereto through solenoid-operated valve 38, and mechanically operated air-control valve 39. The valve 38 has an operating arm 41 connected to a rod 42, the center portion 40 of which is not shown black, to represent the iron armature portion, passing through a solenoid 43. The electric circuit to the solenoid is through mercury switch 44 of device 29, so that when the depending operating arm 45 of said switch is not engaged by tubing 25, said switch is open and the solenoid receives no power from the source, not shown, through supply lines 46 and 47.

The valve 39 has an operating arm 48, which is normally disposed to the right as illustrated in Fig. 2, thereby connecting the valve 38 to the cylinder 32. However, when the carriage 13 moves from the position illustrated in full lines in Fig. 1, where the operating roller 49 on the end of the arm 48 engages stop 51, to the position illustrated in dotted lines in Fig. 1 where said roller engages stop 52, the valve 39 is closed, allowing the air in the cylinder 32 to be released to the atmosphere.

Beneath the switch device 29 is desirably provided means for removing the cut pieces of tubing. Said means, in the present embodiment, comprises a chain conveyor 53, the links 54 of which, being desirably so formed that each may hold a piece of tubing after the same has been cut off, as indicated at 55. The chains 70, a plurality of which being desirably provided, travel over sprocket wheels or pulleys 56 carried by a shaft 57, and are driven in any desired manner as by means of a chain 58 from shaft-carried sprocket wheel or pulley 59 to motor, not shown. In this way, the lengths of tubing as cut off are removed and prevented from accumulating beneath the switch device 29.

A preferred method of operating the apparatus for accurately cutting off lengths of tubing is as follows: The tubing 25, operated by the supporting pulling machine 26, passes through the normally-released clamping jaws 17 and the crack-off burner 15, which is then operating and receives gas from tube or pipe 61, and under the cracking device 27. The free end of the tubing, projecting from and supported as a cantilever by the machine 26, engages the roller 62 and lifts up the switch device 29, prevented from swinging too low about its pivot pin 50 by stop 60. The free end then engages and swings the operating arm 45, causing the mercury switch 44 to close, and the solenoid 43 is energized, moving the valve arm 41 to the left, as viewed in Fig. 2, and admitting compressed air through the then-open valve 39, to the cylinder 32 to cause the jaws 17 to close. Their desirably-resilient or padded inner surface portions 63 engage and grip the moving tubing 25, and cause the carriage 13 to move along with it.

This operation causes the crack-off burner to heat the tubing at a certain point thereon which is spaced, from the operating switch arm 45, the exact distance corresponding with the lengths of tubing to be cut. The temperature to which the tubing is heated by the burner does not have to be accurately controlled. It is merely high enough so that a fast temperature change occurs, when engaged by the device 27, and severance occurs, while not too high to cause it to deform by its own weight.

This concurrent movement continues until the stop 52 engages the roller 49 on valve arm 48, shutting the valve 39 and releasing the compressed air in the cylinder 32. This allows the jaws 17 to open, and the carriage to be detached from the moving tubing and returned by the heavy chain or other biasing device 64, pulling thereagainst. When the carriage reaches the position illustrated in full lines in Fig. 1, the valve arm 48 is returned to its initial position by engagement of the roller 49 with the stop 51, thereby opening the valve 39 and getting ready for a readmission of air to the cylinder 32.

During this return movement of the carriage, but before opening of the valve 39, the tubing passes on until the point which was heated by the crack-off burner 15 is engaged by the relatively-cool cracking block or device 27, whereupon a severance takes place, and a cut section drops upon the receiving device or chain conveyor 53, and is removed. This dropping of the cut section allows the mercury switch 44 to return to initial position, shown in full lines, whereupon the valve 38 is closed by return spring 65, prior to opening the valve 39.

Further movement of the tubing 25 causes its then free end to again engage the roller 62 and mercury switch operating arm 45, thereby again causing the mercury switch 44 to close, actuate the solenoid 43, and open the air valve 38, repeating the cutting-off process.

A summary of the foregoing operations is as follows:

1. The tubing 25 passes through clamping jaws 17 and crack-off burner 15, until its free end causes closing of the mercury switch 44.

2. Solenoid 43 is energized by circuit through said switch 44, opening valve 38 on carriage for clamping jaws 17 and crack-off burner 15, and admitting air to clamping-jaws operating cylinder 32.

3. Clamping jaws grip tubing, causing carriage 13 to be pulled along while crack-off burner 15 heats tubing until stop 52 causes air valve 39 to close, exhausting air from cylinder 32.

4. Piston 31 descends in cylinder 32, by gravity and under action of spring 22, releasing clamping jaws 17, and heated part of tubing overruns burner 15, passes under cracking device 27, and cut-off portion drops to conveyor 53, allowing mercury switch 44 to reopen.

5. Solenoid 43 is deenergized, allowing valve 38 to close, cutting off air to valve 39.

6. Carriage 13 is returned to initial position and valve 39 is opened by engagement of its operating arm roller 49 with stop 51.

7. The remainder of the tubing 25 continues its travel until its then free end causes closing of mercury switch 44, and the process is repeated.

From the foregoing, it will be seen that I have provided apparatus for accurately cutting off lengths of glass tubing, conveniently and quickly, the accuracy, because of the nicety of the control, being such that the cut-off lengths of tubing may be used in the making of fluorescent lamps, or other devices in which the accuracy of the length is important, without subsequent trimming or cutting.

Although a preferred embodiment of my invention has been disclosed, it will be understood that modifications may be made within the spirit and scope of the invention.

I claim:

1. Apparatus for cutting off lengths of vitreous tubing, comprising clamping jaws through which when released said tubing passes, a crack-off burner forward of said jaws and through which said tubing passes, a carriage for said jaws and burner, movable with said tubing when the jaws grip the latter, a cracking device for severing a section of tubing at the point heated by said burner, a switch device beyond said cracking device, said switch device being carried on the top of a normally vertical arm which terminates below the line of movement of the tubing so as to be engaged and turned by the free end of said tubing and comprising a normally-open mercury switch turnable with said arm to close a circuit upon engagement of said arm by the tubing, said arm being pivotally connected to the free end of a lever carried on a fixed pivot, said lever carrying a roller on its lower side between the arm and fixed pivot, below which said arm extends, adapted to ride up on the tubing for holding the switch device at an operative elevation, a solenoid-operated valve in said carriage, means energizing the solenoid of said valve through said switch, a mechanically-operated valve in said carriage, stationary means for, respectively, closing and opening said mechanically-operated valve, and means also in said carriage for operating said clamping jaws and receiving air through said solenoid-operated and mechanically-operated valves in succession.

2. Apparatus for cutting-off lengths of vitreous material comprising a supporting frame, means for moving such material for a predetermined distance longitudinally in an approximately horizontal direction, a relatively heavy weight loosely-mounted on said frame above the path of movement of said material and normally engaged thereby to serve as a cracking device, means for heating said material while so moving and at such a distance from said end, whereby severance is effected when the heated portion engages said cracking device, gripping means for moving with said heating means to cause the latter to travel with the material, a switch device beyond said cracking device, said switch device being carried on the top of a normally vertical arm which terminates below the line of movement of the tubing so as to be engaged and turned by the free end of said tubing and comprising a normally-open mercury switch turnable with said arm to close a circuit upon engagement of said arm by the tubing, said arm being pivotally connected to the free end of a lever carried on a fixed pivot, said lever carrying a roller on its lower side between the arm and fixed pivot, below which said arm extends, adapted to ride up on the tubing for holding the switch device at an operative elevation, a solenoid-operated valve in said carriage, means energizing the solenoid of said valve through said switch, a mechanically-operated valve in said carriage, stationary forward and rearward stops for, respectively, closing and opening said last-mentioned valve, an operating cylinder in said carriage, a piston therein for operating said gripping means, and means for continuing said moving, heating, and severing.

3. Apparatus for cutting off lengths of vitreous tubing, comprising means for drawing said tubing, clamping jaws through which, when released, said tubing passes, a crack-off burner, forward of said jaws and through which said tubing passes, a carriage for said jaws and burner, movable with said tubing when the jaws grip the latter, means for returning said carriage to initial position upon release of said jaws, a cracking device for severing a section of tubing at the location heated by said burner, a switch device beyond said cracking device, said switch device being carried on the top of a normally vertical arm which terminates below the line of movement of the tubing so as to be engaged and turned by the free end of said tubing and comprising a normally-open mercury switch turnable with said arm to close a circuit upon engagement of said arm by the tubing, said arm being pivotally connected to the free end of a lever carried on a fixed pivot, said lever carrying a roller on its lower side between the arm and fixed pivot, below which said arm extends, adapted to ride up on the tubing for holding the switch device at an operative elevation, a solenoid-operated valve in said carriage, means energizing the solenoid of said valve through said switch, a mechanically-operated valve in said carriage, stationary forward and rearward stops for, respectively, closing and opening said last-mentioned valve, an operating cylinder in said carriage a piston therein for operating said clamping jaws and receiving air in succession through said solenoid-operated and mechanically-operated valves, whereby said tubing first moves through said clamping jaws and crack-off burner, until its free end rides under the roller, engages said switch arm and closes said switch, energizing the solenoid, opening its valve, admitting air in succession through both of said valves to the operating cylinder, causing the clamping jaws to grip the tubing and move the carriage therewith, until the forward stop closes the mechanically-operated valve, releasing the jaws, allowing the tubing to overrun the carriage, pass under the cracking device and be severed, the cut portion to drop, the switch to open, the air to be cut off by the solenoid-operated valve, until the released carriage has been returned to initial position, the mechanically-operated valve has been opened by said rearward stop, and the then-free end of the tubing again causes closing of the switch for a repetition of the operation.

MICHAEL E. McGOWAN.

REFERENCES CITED

The following references are of record in the file of this patent:

UNITED STATES PATENTS

| Number | Name | Date |
| --- | --- | --- |
| 1,220,201 | Danner | Mar. 27, 1917 |
| 1,710,898 | Rowley | Apr. 30, 1929 |
| 1,744,045 | Halbach | Jan. 21, 1930 |
| 1,765,814 | Wright | June 24, 1930 |
| 2,221,788 | Doyle | Nov. 19, 1940 |
| 2,310,469 | Snyder | Feb. 9, 1943 |
| 2,323,182 | Stuckert | June 29, 1943 |
| 2,521,352 | Dockerty et al. | Sept. 5, 1950 |

FOREIGN PATENTS

| Number | Country | Date |
| --- | --- | --- |
| 685,758 | France | Apr. 7, 1930 |